US012443482B2

(12) United States Patent
Lee et al.

(10) Patent No.: US 12,443,482 B2
(45) Date of Patent: Oct. 14, 2025

(54) MEMORY INCLUDING ECC ENGINE

(71) Applicant: SK hynix Inc., Gyeonggi-do (KR)

(72) Inventors: Jae Hun Lee, Gyeonggi-do (KR); Sun Ho Kim, Gyeonggi-do (KR); Yong Mi Kim, Gyeonggi-do (KR); Sang Uhn Cha, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 18/585,336

(22) Filed: Feb. 23, 2024

(65) Prior Publication Data

US 2025/0173215 A1 May 29, 2025

(30) Foreign Application Priority Data

Nov. 29, 2023 (KR) .................. 10-2023-0168735

(51) Int. Cl.
G06F 11/08 (2006.01)
(52) U.S. Cl.
CPC .................... G06F 11/08 (2013.01)
(58) Field of Classification Search
None
See application file for complete search history.

(56) References Cited

U.S. PATENT DOCUMENTS

| 11,658,685 | B2 * | 5/2023 | Chung | G06F 11/1048 714/764 |
| 2019/0250985 | A1 * | 8/2019 | Seo | G06F 11/1068 |
| 2021/0311826 | A1 | 10/2021 | Senoo | |
| 2022/0043710 | A1 * | 2/2022 | Kang | G06F 12/109 |
| 2023/0178168 | A1 | 6/2023 | Cho et al. | |

FOREIGN PATENT DOCUMENTS

| CN | 115050415 A | * | 9/2022 | ......... G06F 11/1008 |
| KR | 20190097657 A | | 8/2019 | |

OTHER PUBLICATIONS

Partial European Search Report for European Patent Application No. 24199631.3 issued by the European Patent Office on Mar. 17, 2025.

* cited by examiner

Primary Examiner — Guerrier Merant
(74) Attorney, Agent, or Firm — IP & T GROUP LLP

(57) ABSTRACT

A memory may include a memory core; a first ECC engine configured to correct an error having a first pattern, the error occurring in read data read from the memory core; and a second ECC engine configured to correct an error having a second pattern, the error occurring in the read data read from the memory core. One of the first ECC engine and the second ECC engine may be selectively activated based on an address used to access the memory core.

15 Claims, 6 Drawing Sheets

FIG. 3
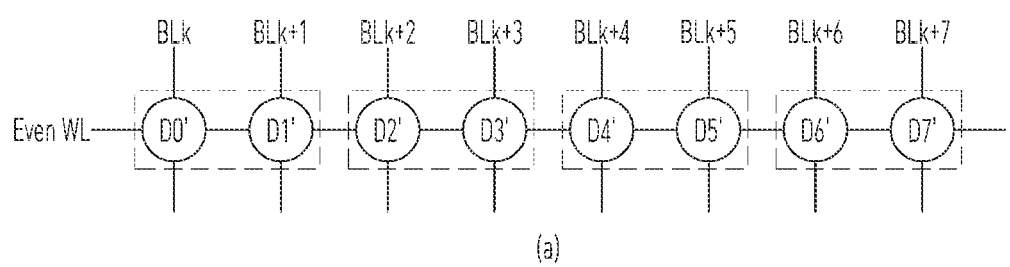
(a)
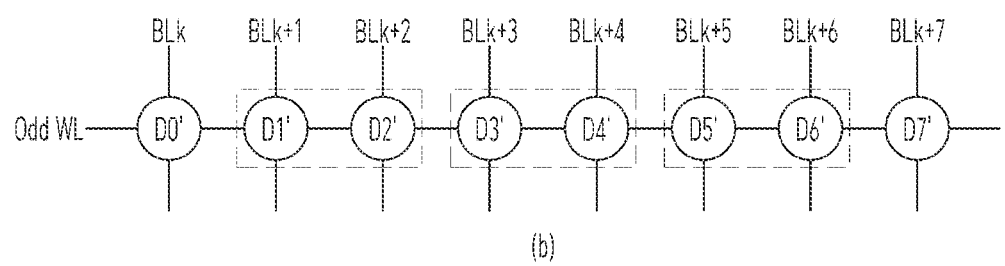
(b)

FIG. 5
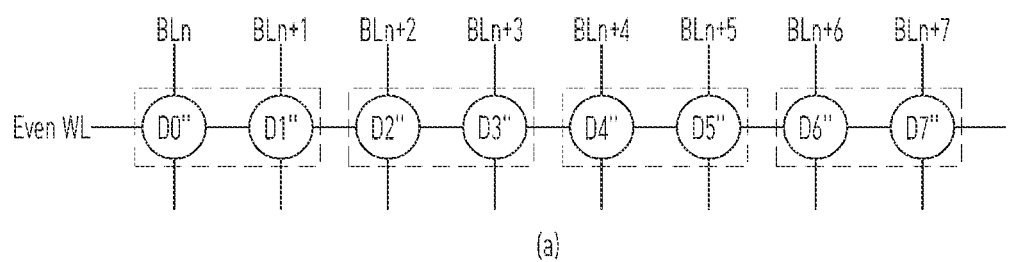
(a)
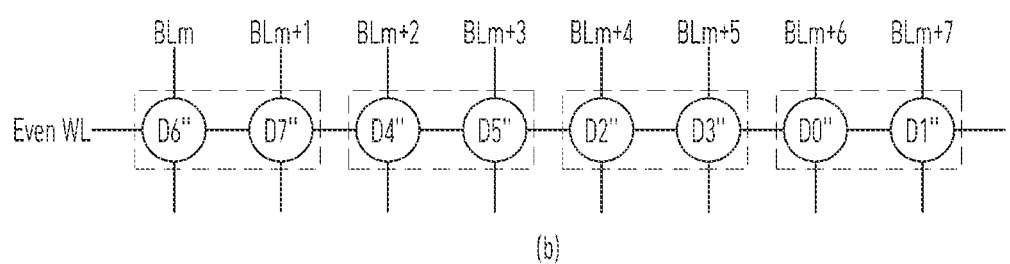
(b)
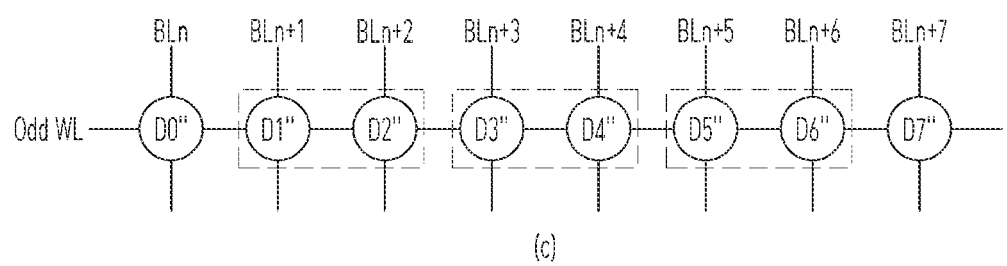
(c)
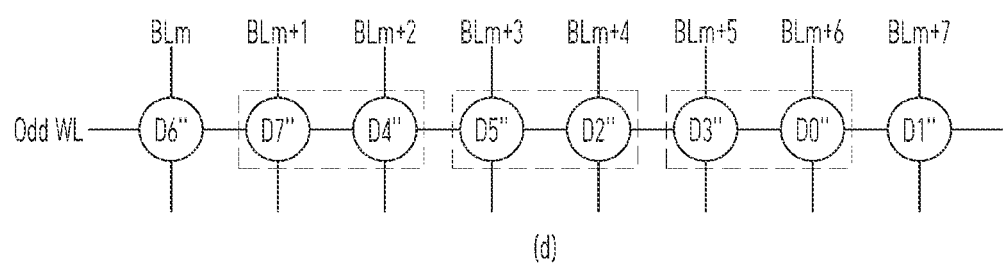
(d)

FIG. 6
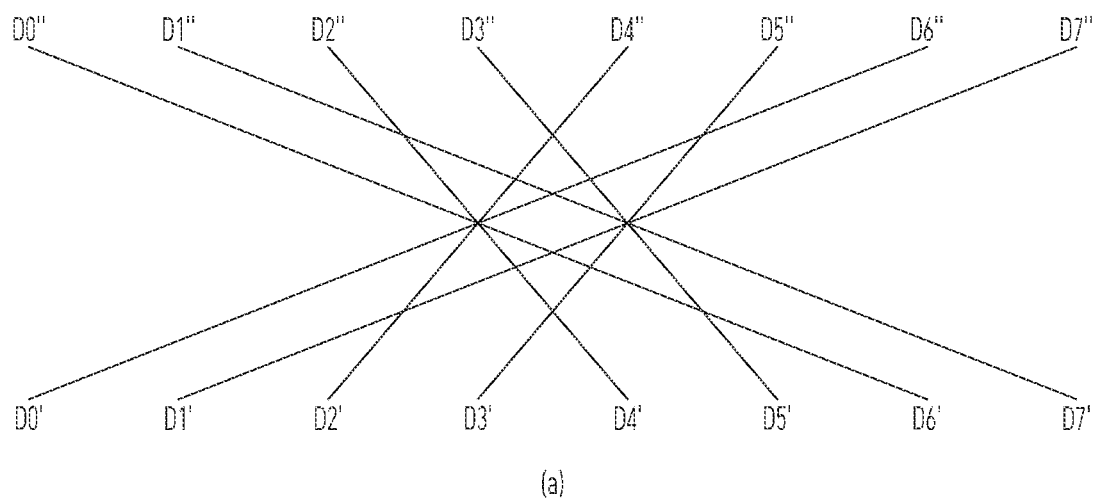
(a)
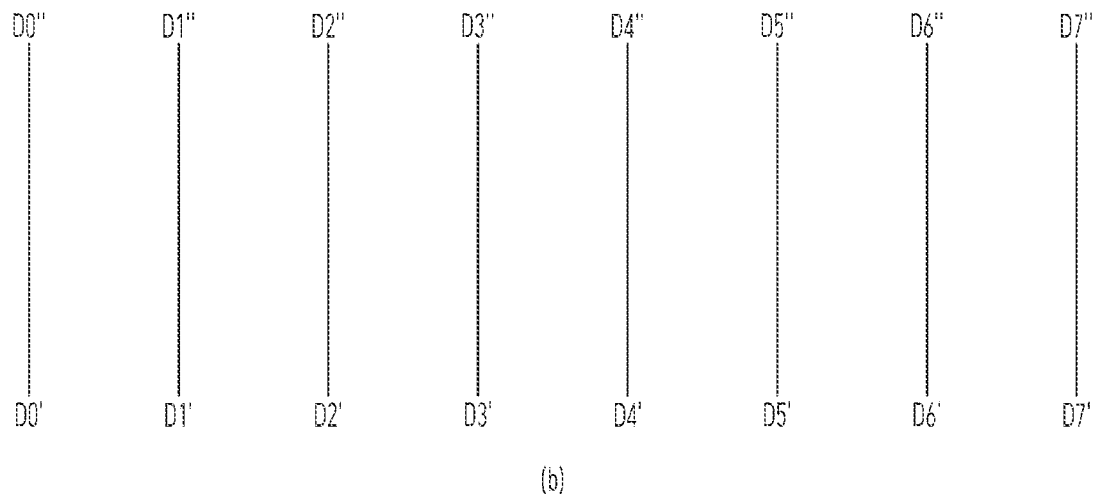
(b)

MEMORY INCLUDING ECC ENGINE

CROSS-REFERENCE TO RELATED APPLICATION

This application claims priority under 35 U.S.C. § 119 (a) to Korean Patent Application No. 10-2023-0168735 filed on Nov. 29, 2023, which is incorporated herein by reference in its entirety.

BACKGROUND

1. Technical Field

Embodiments of the present disclosure relate to a memory and, particularly, to an error correction in a memory.

2. Related Art

In the early stage of the semiconductor memory industry, a plurality of original good dies, each having no defective memory cells in a memory which has passed through a semiconductor manufacturing process, have been distributed on a wafer. However, as the capacity of a memory gradually increases, it becomes difficult to produce a memory having no defective memory cells. At the present time, there is no probability that such a memory will be manufactured. One way to overcome such a situation uses a method of repairing defective memory cells of a memory with redundancy memory cells.

Another way uses an error correction circuit (ECC) engine that corrects an error in a memory cell.

SUMMARY

A memory in accordance with an embodiment of the present disclosure may include a memory core; a first ECC engine configured to correct an error having a first pattern, occurring in read data read from the memory core; and a second ECC engine configured to correct an error having a second pattern, occurring in the read data read from the memory core, wherein one of the first ECC engine and the second ECC engine is selectively activated based on an address used to access the memory core.

A memory in accordance with an embodiment of the present disclosure may include a memory core; an ECC engine configured to correct an error in data read from the memory core; and a data swap circuit configured to change an arrangement of data transmitted between the ECC engine and the memory core based on an address used to access the memory core.

An operation method of a memory in accordance with an embodiment of the present disclosure may include: correcting, by a first ECC engine, an error having a first pattern, occurring in read data read from a memory core based on an address used to access the memory core; and correcting, by a second ECC engine, an error having a second pattern, occurring in the read data read from the memory core based on the address used to access the memory core.

BRIEF DESCRIPTION OF THE DRAWINGS

FIG. 3 is a diagram illustrating a form in which 8 bits of data are stored in a cell area of FIG. 2.

FIG. 5 is a diagram illustrating a form in which 8 bits of data are stored in a cell area of FIG. 4.

FIG. 6 is a diagram for describing an operation of a data swap circuit in accordance with an embodiment of the present disclosure.

DETAILED DESCRIPTION

Various embodiments of the present disclosure are directed to a technology for reducing areas of circuits required for error correction of a memory.

Embodiments of the present disclosure provide a technology for reducing areas of circuits required for error correction of a memory.

Hereafter, embodiments in accordance with the technical spirit of the present disclosure are described with reference to the accompanying drawings.

Figure 1:
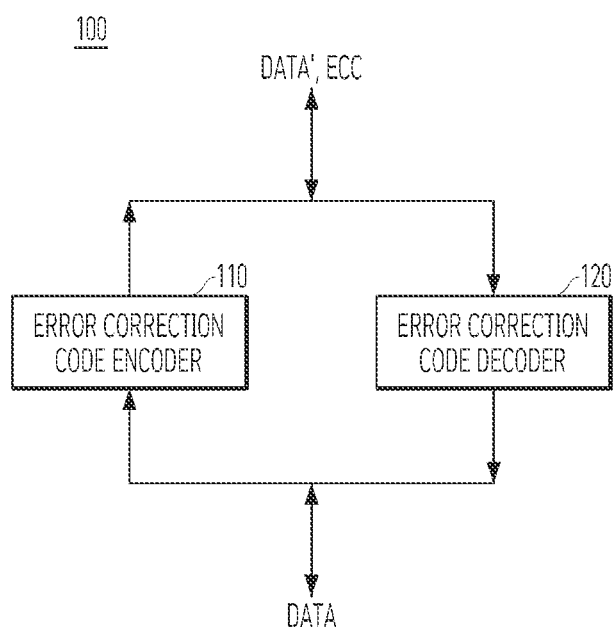
FIG. 1 is a diagram illustrating a configuration of an ECC engine in accordance with an embodiment of the present disclosure.

FIG. 1 is a diagram illustrating a configuration of an ECC engine 100 in accordance with an embodiment of the present disclosure.

Referring to FIG. 1, the ECC engine 100 may include an error correction code encoder 110 and an array correction code decoder 120.

The error correction code encoder 110 may generate an error correction code ECC by using data DATA transmitted from the outside of a memory (e.g., transmitted from a memory controller) during a write operation. That is, the error correction code encoder 110 may generate the error correction code ECC for correcting an error in data by encoding the data DATA. The data DATA to be encoded in the process of generating the error correction code ECC is also called a message. During the write operation, because the error correction code ECC is generated but no error correction operation is performed, the data DATA input to the error correction code encoder 110 and data DATA' output from the error correction code encoder 110 may be the same.

During the write operation, the data DATA' and the error correction code ECC may be stored in a memory core (not illustrated). During a read operation, the data DATA' and the error correction code ECC may be read from the memory core and transmitted to the error correction code decoder 120.

During a read operation, the error correction code decoder 120 may correct an error in the data DATA' by using the error correction code ECC. Correcting an error may mean detecting the error in the data DATA' by using the error correction code ECC and correcting the error when the error is detected. The data DATA error-corrected by the error correction code decoder 120 may be output to the outside of the memory (e.g., transmitted to the memory controller).

Figure 2:
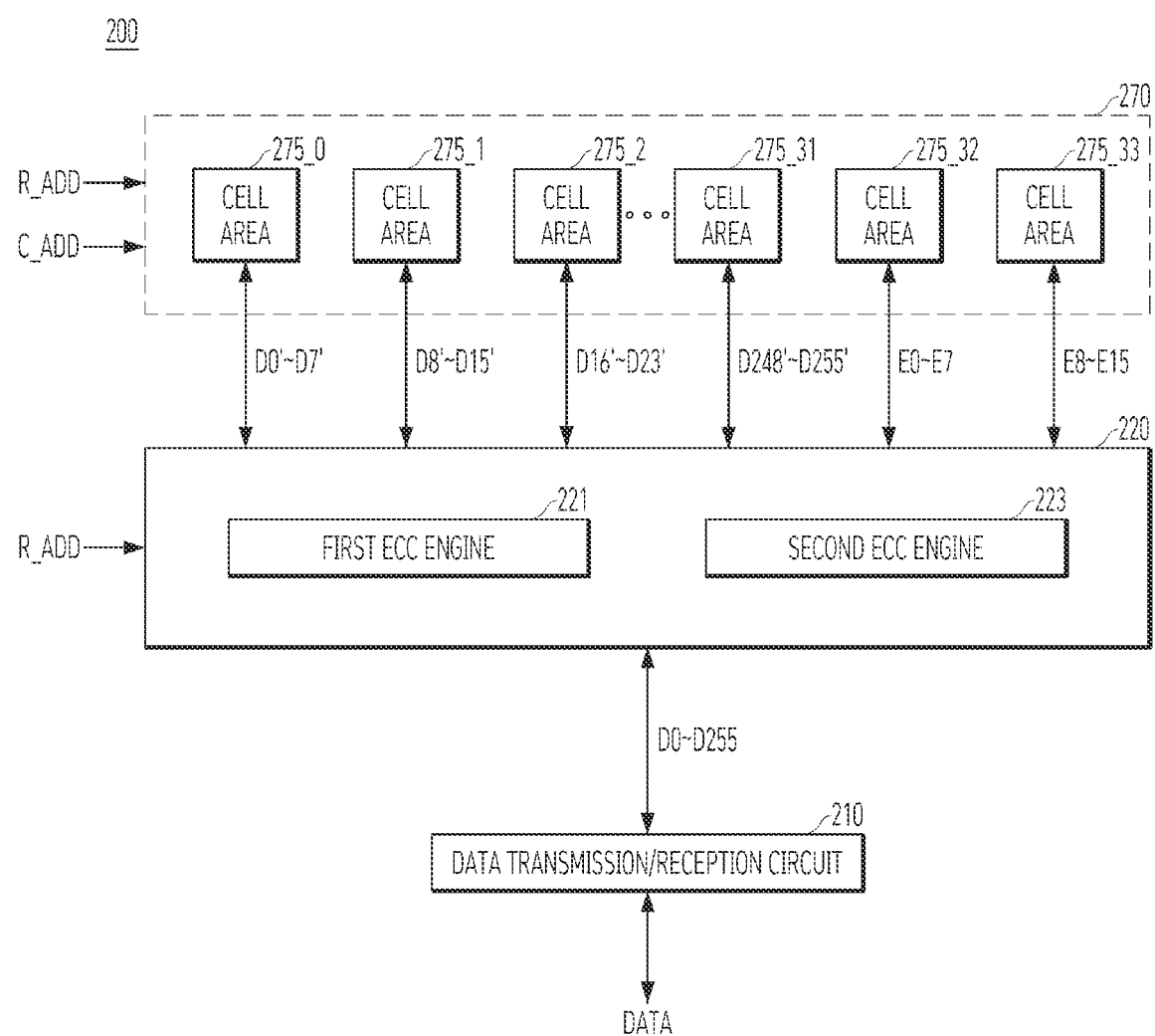
FIG. 2 is a diagram illustrating a configuration of a memory in accordance with an embodiment of the present disclosure.

FIG. 2 is a diagram illustrating a configuration of a memory 200 in accordance with an embodiment of the present disclosure.

Referring to FIG. 2, the memory 200 may include a data transmission/reception circuit 210, an ECC block 220, and a memory core 270.

The data transmission/reception circuit 210 may transmit/receive the data DATA. The data transmission/reception circuit 210 may receive the data DATA transmitted from the memory controller during a write operation, and may transmit the data DATA to the memory controller during a read operation. FIG. 2 illustrates that the number of bits of the data DATA transmitted/received by the data transmission/reception circuit 210 during one-time write and read operation is 256 bits (i.e., D0 to D255).

During a write operation, the ECC block 220 may generate 16 bits of error correction codes E0 to E15 by using data D0 to D255 received through the data transmission/reception circuit 210. Because the error correction codes E0 to E15 are generated and no error correction operation is performed during the write operation, the data D0 to D255 input to the ECC block 220 during the write operation and data D0' to D255' output from the ECC block 220 may be the same. During a read operation, the ECC block 220 may correct an error in the data D0' to D255' transmitted from the memory core 270 by using the error correction codes E0 to E15 transmitted from the memory core 270. Correcting an error may mean detecting the error in the data D0' to D255' by using the error correction codes E0 to E15 and correcting the error when the error is detected.

The ECC block 220 may include a first ECC engine 221 and a second ECC engine 223. One of the two ECC engines 221 and 223 may be selected and activated by a row address R_ADD used to access the memory core 270. That is, an operation of generating the error correction codes E0 to E15 and an operation of correcting an error may be performed by the activated ECC engine of the two ECC engines 221 and 223. Details thereof are described below.

The memory core 270 may include a plurality of cell areas 275_0 to 275_33. Each of the cell areas may include a plurality of rows, a plurality of columns, and a plurality of memory cells formed at intersections of the rows and the columns. Each of the cell areas 275_0 to 275_33 may store 8 bits of data for a one-time write operation. For example, the data D0' to D7' may be stored in the cell area 275_0, and the data D8' to D15' may be stored in the cell area 275_1. The error correction codes E0 to E7 may be stored in the cell area 275_32, and the error correction codes E8 to E15 may be stored in the cell area 275_33.

During a write operation, one of the plurality of rows (i.e., word lines) may be selected in each of the cell areas 275_0 to 275_33 by the row address R_ADD, eight of the plurality of columns (i.e., bit lines) may be selected by a column address C_ADD, and data may be stored in eight memory cells of the selected row and selected columns. Likewise, during a read operation, data may be read from eight memory cells selected by the row address R_ADD and the column address C_ADD in each of the cell areas 275_0 to 275_33.

FIG. 2 illustrates that 256 bits of data D0 to D255 are input and output to/from the memory 200 during a one-time write and read operation and 16 bits of error correction codes E0 to E15 are used. However, this is merely an example, and the number of bits of data and the number of bits of the error correction code may be different from the example in FIG. 2.

FIG. 3 is a diagram illustrating a form in which 8 bits of data D0' to D7' are stored in the cell area 275_0 of FIG. 2.

Section (a) of FIG. 3 illustrates a form in which the data D0' to D7' are stored in the cell area 275_0 when the row address R_ADD is an even number.

Referring to (a) of FIG. 3, the 8 bits of data D0' to D7' are stored in eight memory cells formed at interconnections between an even word line Even WL, meaning a word line selected by an even-numbered row address, and eight bit lines BLk to BLk+7 meaning eight bit lines selected by a column address. The dotted line in (a) of FIG. 3 is a line grouping memory cells in which storage node bridge failure is highly likely to occur. For example, it may mean that there is a high probability that a bridge may occur in a storage node of a memory cell storing the data D0' and a storage node of a memory cell storing the data D1', and there is a high probability that a bridge may occur in a storage node of a memory cell storing the data D2' and a storage node of a memory cell storing the data D3'. That is, there is a high probability that an error may occur in the data D0' and the data D1' at the same time, and there is a high probability that an error may occur in the data D2' and the data D3' at the same time.

Section (b) of FIG. 3 illustrates a form in which the data D0' to D7' are stored in the cell area 275_0 when the row address R_ADD is an odd number.

Referring to (b) of FIG. 3, the 8 bits of data D0' to D7' are stored in eight memory cells formed at interconnections between an odd word line ODD WL, meaning a word line selected by an odd-numbered row address, and eight bit lines BLk to BLk+7 meaning eight bit lines selected by a column address. The dotted line in (b) of FIG. 3 is a line grouping memory cells in which storage node bridge failure is highly likely to occur. In (b) of FIG. 3, unlike (a) of FIG. 3, an error may occur in the data D1' and the data D2' at the same time with a high probability, and an error may occur in the data D5' and the data D6' at the same time with a high probability. This may be due to the arrangement forms of the memory cells of the even word line Even WL and the odd word line Odd WL which are different from each other.

That is, the 2-bit data pairs in which an error is highly likely to occur at the same time are different from the cases of (a) and (b) of FIG. 3.

FIG. 3 illustrates the form in which the 8 bits of data D0' to D7' are stored in the cell area 275_0. A form in which 8 bits of data D8' to D15' are stored in the cell area 275_1, a form in which 8 bits of data D16' to D23' are stored in the cell area 275_2, a form in which data D24' to D255' and the error correction codes E0 to E15 are stored in the cell areas 275_3 to 275_33 may also be the same.

Referring again to FIG. 2, each of the first ECC engine 221 and the second ECC engine 223 of the ECC block 220 may be able to correct all 1-bit errors occurring in the data D0' to D255'. For example, when an error occurs only in the data D9', the first ECC engine 221 and the second ECC engine 223 may be able to correct the error.

Each of the first ECC engine 221 and the second ECC engine 223 may be able to correct 2-bit errors having a limited pattern occurring in the data D0' to D255'. It would be preferable if the ECC engine could correct 2-bit errors having all patterns; however, in such a case, the number of bits of the error correction code needs to be increased and an area of the ECC engine needs to be greatly expanded.

The first ECC engine 221 may be able to correct an error in 2 bits of data having a pattern in which an error is highly likely to occur at the same time, as illustrated in (a) of FIG. 3. For example, when an error occurs in the 2-bit data D0' and D1', an error occurs in the 2-bit data D2' and D3', an error occurs in the 2-bit data D4' and D5', or an error occurs in the 2-bit data D6' and D7', the first ECC engine 221 may be able to correct the error. Likewise, even though an error occurs in the 2-bit data D8' and D9', the first ECC engine 221 may be able to correct the error. That is, the first ECC engine 221 may be able to correct an error occurring in 2-bit data Dx' and Dx+1', where x is an even number of 0 or more. On the other hand, when an error occurs in the 2-bit data D1' and D2', the first ECC engine 221 is not able to correct the error.

The second ECC engine 223 may be able to correct an error in 2-bit data having a pattern in which an error is highly likely to occur at the same time, as illustrated in (b) of FIG. 3. For example, when an error occurs in the 2-bit data D1' and D2', an error occurs in the 2-bit data D3' and D4', an error occurs in the 2-bit data D5' and D6', or an error occurs in the 2-bit data D7' and D0', the second ECC engine 223 may correct the error. Likewise, even though an error occurs in the 2-bit data D9' and D10', the second ECC engine 223 may be able to correct the error. On the other hand, the second ECC engine 223 is not able to correct an error in 2-bit data correctable by the first ECC engine 221. For example, the second ECC engine 223 is not able to correct an error occurring in the 2-bit data D0' and D1'.

When the row address R_ADD is an even number, that is, when the even word line Even WL is accessed in the cell areas 275_0 to 275_33, the first ECC engine 221 may be selected and activated in the ECC block 220. That is, during write and read operations, when the row address R_ADD is an even number, the first ECC engine 221 may be used. This is because the first ECC engine 221 can correct a 2-bit error that is highly likely to occur in the even word line Even WL, so it is advantageous to use the first ECC engine 221.

When the row address R_ADD is an odd number, that is, when the odd word line Odd WL is accessed in the cell areas 275_0 to 275_33, the second ECC engine 223 may be selected and activated in the ECC block 220. That is, during write and read operations, when the row address R_ADD is an odd number, the second ECC engine 223 may be used. This is because the second ECC engine 223 can correct a 2-bit error that is highly likely to occur in the odd word line Odd WL, so it is advantageous to use the second ECC engine 223.

Because one of the first ECC engine 221 and the second ECC engine 223 is selected and used according to the possibility of error occurrence, the efficiency of error correction of the memory 200 may be increased.

Figure 4:
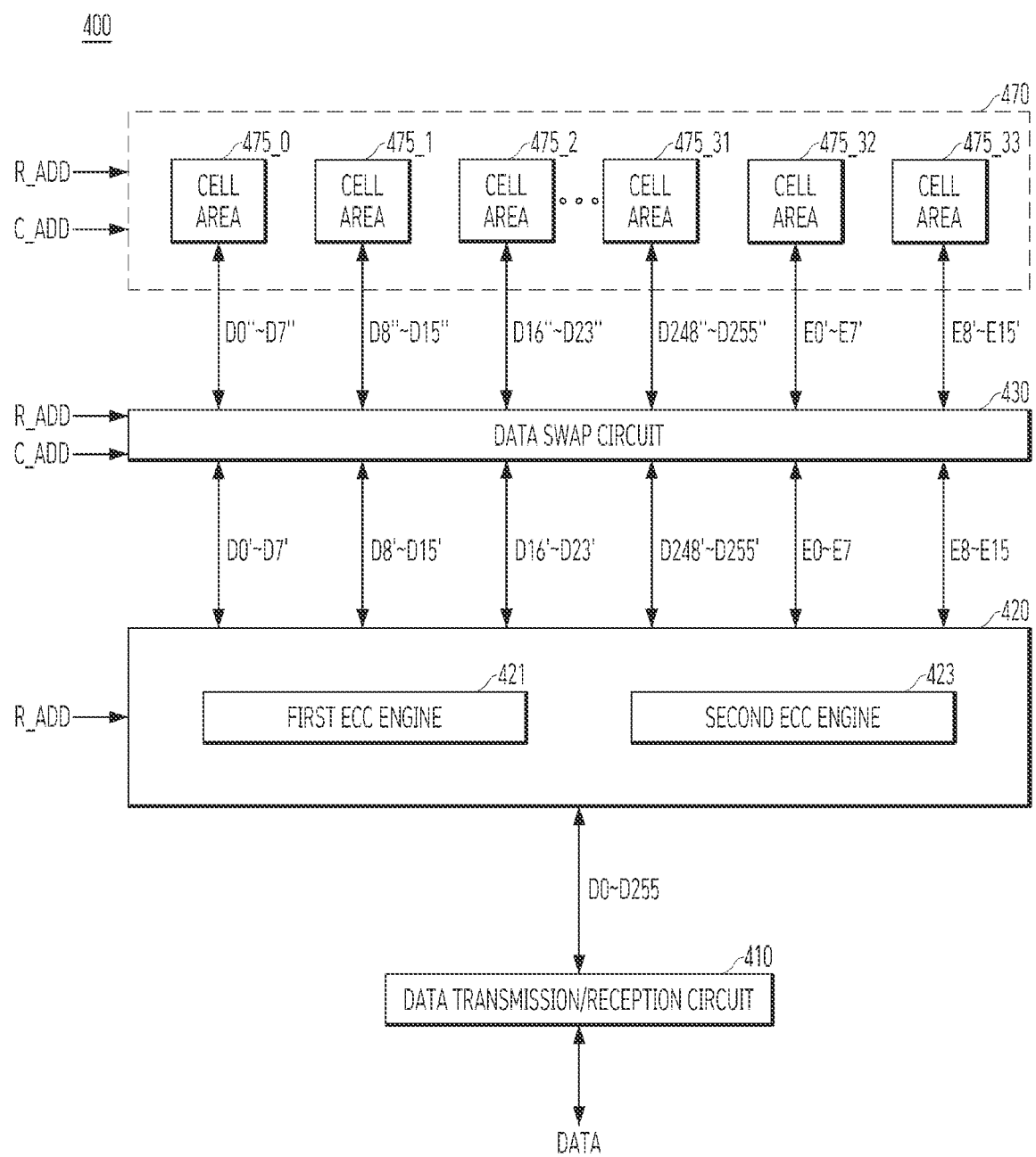
FIG. 4 is a diagram illustrating a configuration of a memory in accordance with another embodiment of the present disclosure.

FIG. 4 is a diagram illustrating a configuration of a memory 400 in accordance with another embodiment of the present disclosure.

Referring to FIG. 4, the memory 400 may include a data transmission/reception circuit 410, an ECC block 420, a data swap circuit 430, and a memory core 470.

The data transmission/reception circuit 410 may transmit/receive data DATA. The data transmission/reception circuit 410 may receive the data DATA transmitted from a memory controller during a write operation, and may transmit the data DATA to the memory controller during a read operation. FIG. 4 illustrates that the number of bits of the data DATA transmitted/received by the data transmission/reception circuit 410 during a one-time write and read operation is 256 bits (i.e., D0 to D255).

During a write operation, the ECC block 420 may generate 16 bits of error correction codes E0 to E15 by using data D0 to D255 received through the data transmission/reception circuit 410. Because the error correction codes E0 to E15 are generated and no error correction operation is performed during the write operation, the data D0 to D255 input to the ECC block 420 during the write operation and data D0' to D255' output from the ECC block 420 may be the same.

During a read operation, the ECC block 420 may correct an error in data D0' to D255' transmitted from the memory core 470 by using the error correction codes E0 to E15 transmitted from the memory core 470. Correcting an error may mean detecting the error in the data D0' to D255' by using the error correction codes E0 to E15 and correcting the error when the error is detected.

The ECC block 420 may include a first ECC engine 421 and a second ECC engine 423. One of the two ECC engines 421 and 423 may be selected and activated by a row address R_ADD used to access the memory core 470. That is, an operation of generating the error correction codes E0 to E15 and an operation of correcting an error may be performed by the activated ECC engine of the two ECC engines 421 and 423. Details thereof are described below.

The data swap circuit 430 may change an arrangement of data transmitted between the ECC block 420 and the memory core 470, in response to addresses R_ADD and C_ADD. That is, the data swap circuit 430 may change the corresponding relationship between the data D0' to D255' and data D0" to D255". The data swap circuit 430 may also change the corresponding relationship between the error correction codes E0 to E15 and error correction codes E0' to E15'. Details thereof are described below.

The memory core 470 may include a plurality of cell areas 475_0 to 475_33. Each of the cell areas 475_0 to 475_33 may include a plurality of rows, a plurality of columns, and a plurality of memory cells formed at intersections of the rows and the columns. Each of the cell areas 475_0 to 475_33 may store 8 bits of data for a one-time write operation. For example, the data D0" to D7" may be stored in the cell area 475_0, and the data D8" to D15" may be stored in the cell area 475_1. The error correction codes E0' to E7' may be stored in the cell area 475_32, and the error correction codes E8' to E15' may be stored in the cell area 475_33.

During a write operation, one of the plurality of rows (i.e., word lines) may be selected in each of the cell areas 475_0 to 475_33 by the row address R_ADD, eight of the plurality of columns (i.e., bit lines) may be selected by a column address C_ADD, and data may be stored in eight memory cells of the selected row and selected columns.

Likewise, during a read operation, data may be read from eight memory cells selected by the row address R_ADD and the column address C_ADD in each of the cell areas 475_0 to 475_33.

FIG. 5 is a diagram illustrating a form in which 8 bits of data D0" to D7" are stored in the cell area 475_0 of FIG. 4.

Section (a) of FIG. 5 illustrates a form in which the data D0" to D7" are stored in the cell area 475_0 when the row address R_ADD is an even number and the column address C_ADD is an even number.

Referring to (a) of FIG. 5, the 8 bits of data D0" to D7" are stored in eight memory cells formed at interconnections between an even word line Even WL, meaning a word line selected by an even-numbered row address, and eight bit lines BLn to BLn+7 meaning eight bit lines selected by an even column address. The dotted line in (a) of FIG. 5 is a line grouping memory cells in which storage node bridge failure is highly likely to occur. For example, it may mean that there is a high probability that a bridge may occur in a storage node of a memory cell storing the data D0" and a storage node of a memory cell storing the data D1", and there is a high probability that a bridge may occur in a storage node of a memory cell storing the data D2" and a storage node of a memory cell storing the data D3". That is, an error may occur in the data D0" and the data D1" at the same time with a high probability, and an error may occur in the data D2" and the data D3" at the same time with a high probability.

Section (b) of FIG. 5 illustrates a form in which the data D0" to D7" are stored in the cell area 475_0 when the row address R_ADD is an even number and the column address C_ADD is an odd number.

Referring to (b) of FIG. 5, the 8 bits of data D0" to D7" are stored in eight memory cells formed at interconnections between an even word line Even WL and eight bit lines BLm to BLm+7 (meaning eight bit lines selected by an odd column address). In the case of (b) of FIG. 5, the data D0" to D7" are stored in the eight memory cells in the order of D6", D7", D4", D5", D2", D3", D0", and D1". The dotted line in (b) of FIG. 5 is a line grouping memory cells in which storage node bridge failure is highly likely to occur. In (b) of FIG. 5, the data are stored in the memory cells in a different order than in (a) of FIG. 5, but data with a high probability of error occurrence are the same.

That is, in (b) of FIG. 5, as in (a) of FIG. 5, an error may occur in the data D2" and the data D3" at the same time with a high probability, and an error may occur in the data D0" and the data D1" at the same time with a high probability.

Section (c) of FIG. 5 illustrates a form in which the data D0" to D7" are stored in the cell area 475_0 when the row address R_ADD is an odd number and the column address C_ADD is an even number.

Referring to (c) of FIG. 5, the 8 bits of data D0" to D7" are stored in eight memory cells formed at interconnections between an odd word line ODD WL (meaning a word line selected by an odd-numbered row address) and eight bit lines BLn to BLn+7 (meaning eight bit lines selected by an even column address). The dotted line in (c) of FIG. 5 is a line grouping memory cells in which storage node bridge failure is highly likely to occur. In (c) of FIG. 5, unlike (a) and (b) of FIG. 5, an error may occur in the data D1" and the data D2" at the same time with a high probability and an error may occur in the data D5" and the data D6" at the same time with a high probability. This may be due to the arrangement forms of the memory cells of the even word line Even WL and the odd word line Odd WL which are different from each other.

That is, 2-bit data pairs in which an error is highly likely to occur at the same time are different from the case of (c) of FIG. 5 and the cases of (a) and (b) of FIG. 5.

Section (d) of FIG. 5 illustrates a form in which the data D0" to D7" are stored in the cell area 475_0 when the row address R_ADD is an odd number and the column address C_ADD is an odd number.

Referring to (d) of FIG. 5, the 8 bits of data D0" to D7" are stored in eight memory cells formed at interconnections between an odd word line ODD WL and eight bit lines BLm to BLm+7 (meaning eight word lines selected by an odd column address). The dotted line in (d) of FIG. 5 is a line grouping memory cells in which storage node bridge failure is highly likely to occur. In the case of (d) of FIG. 5, the data D0" to D7" are stored in the eight memory cells in the order of D6", D7", D4", D5", D2", D3", D0", and D1". The dotted line in (d) of FIG. 5 is a line grouping memory cells in which storage node bridge failure is highly likely to occur. In (d) of FIG. 5, unlike (a) to (c) of FIG. 5, an error may occur in the data D7" and the data D4" at the same time with a high probability, an error may occur in the data D5" and the data D2" at the same time with a high probability, and an error may occur in the data D3" and the data D0" at the same time with a high probability.

That is, in the case of (d) of FIG. 5, 2-bit data pairs in which an error is highly likely to occur at the same time are different from the cases of (a) to (c) of FIG. 5.

FIG. 5 illustrates the form in which the 8 bits of data D0" to D7" are stored in the cell area 475_0. A form in which 8-bit data D8" to D15" are stored in the cell area 475_1, a form in which 8-bit data D16" to D23" are stored in the cell area 475_2, a form in which data D24" to D255" and error correction codes E0' to E15' are stored in the cell areas 475_3 to 475_33 may also be the same.

Referring again to FIG. 4, each of the first ECC engine 421 and the second ECC engine 423 of the ECC block 420 may be able to correct all 1-bit errors occurring in the data D0' to D255'. For example, when an error occurs only in the data D9', the first ECC engine 421 and the second ECC engine 423 may be able to correct the error.

Each of the first ECC engine 421 and the second ECC engine 423 may be able to correct 2-bit errors having a limited pattern occurring in the data D0' to D255'. It would be preferable if the ECC engine could correct 2-bit errors having all patterns; however, in such a case, the number of bits of the error correction code needs to be increased and an area of the ECC engine needs to be greatly expanded.

The first ECC engine 421 may be able to correct an error in 2 bits of data having a pattern in which an error is likely to occur at the same time, as illustrated in (a) and (b) of FIG. 5. For example, when an error occurs in the 2-bit data D0' and D1', an error occurs in the 2-bit data D2' and D3', an error occurs in the 2-bit data D4' and D5', or an error occurs in the 2-bit data D6' and D7', the first ECC engine 421 may be able to correct the error. Likewise, even though an error occurs in the 2-bit data D8' and D9', the first ECC engine 421 may be able to correct the error. That is, the first ECC engine 421 may be able to correct an error occurring in 2-bit data Dx' and Dx+1' (x is an even number of 0 or more). On the other hand, when an error occurs in the 2-bit data D1' and D2', the first ECC engine 421 is not able to correct the error.

The second ECC engine 423 may be able to correct an error in 2-bit data having a pattern in which an error is likely to occur at the same time, as illustrated in (c) of FIG. 5. For example, when an error occurs in the 2-bit data D1' and D2', an error occurs in the 2-bit data D3' and D4', an error occurs in the 2-bit data D5' and D6', or an error occurs in the 2-bit data D7' and D0', the second ECC engine 423 may be able to correct the error. Likewise, even though an error occurs in the 2-bit data D9' and D10', the second ECC engine 423 may be able to correct the error. On the other hand, the second ECC engine 423 is not able to correct an error in 2-bit data correctable by the first ECC engine 421. For example, the second ECC engine 423 is not able to correct an error occurring in the 2-bit data D0' and D1'.

When the row address R_ADD is an even number, that is, when the even word line Even WL is accessed in the cell areas 475_0 to 475_33, the first ECC engine 421 may be selected and activated in the ECC block 420. That is, during write and read operations, when the row address R_ADD is an even number, the first ECC engine 421 may be used. This is because the first ECC engine 421 can correct a 2-bit error that is highly likely to occur and illustrated in (a) and (b) of FIG. 5, so it is advantageous to use the first ECC engine 421.

When the row address R_ADD is an odd number, that is, when the odd word line Odd WL is accessed in the cell areas 475_0 to 475_33, the second ECC engine 423 may be selected and activated in the ECC block 420. That is, during write and read operations, when the row address R_ADD is an odd number, the second ECC engine 423 may be used. The second ECC engine 423 can correct a 2-bit error that is highly likely to occur and illustrated in (c) of FIG. 5. However, because the second ECC engine 423 is not able to correct a 2-bit error that is highly likely to occur and illustrated in (d) of FIG. 5, the data swap circuit 430 may be required.

The data swap circuit 430 may allow the second ECC engine 423 to be able to correct the 2-bit error that is highly likely to occur and illustrated in (d) of FIG. 5 by changing the corresponding relationship between the data D0' to D255' and the data D0" to D255" and the corresponding relationship between the error correction codes E0 to E15, and the error correction code E0' to E15' in response to the addresses R_ADD and C_ADD. When the row address R_ADD is an odd number and the column address C_ADD is an odd number, the data swap circuit 430 may change the corresponding relationship between the data D0' to D255' and the data D0" to D255" and the corresponding relationship between the error correction codes E0 to E15 and the error correction code E0' to E15', and may not change the corresponding relationships in other cases.

FIG. 6 is a diagram for describing the operation of the data swap circuit 430 in accordance with another embodiment of the present disclosure. Section (a) of FIG. 6 illustrates the operation of the data swap circuit 430 when the row address R_ADD is an odd number and the column address C_ADD is an odd number. Referring to (a) of FIG. 6, the data D0" corresponds to the data D6', the data D1" corresponds to the data D7', the data D2" corresponds to the data D4', the data D3" corresponds to the data D5', the data D4" corresponds to the data D2', the data D5" corresponds to the data D3', the data D6" corresponds to the data D0', and the data D7" corresponds to the data D1'. As a result, the second ECC engine 423 may be able to correct the 2-bit error that is highly likely to occur and illustrated in (c) of FIG. 5, for example, the 2-bit error occurring in D7" and D4".

Section (b) of FIG. 6 illustrates the operation of the data swap circuit 430 when the row address R_ADD is an even number, and when the row address R_ADD is an odd number and the column address C_ADD is an even number. Referring to (b) of FIG. 6, the data D0" to D7" and the data D0' to D7' correspond to one another in a one-to-one manner without changing the order.

Sections (a) and (b) of FIG. 6 illustrate only the corresponding relationship between the data D0" to D7", but the data D8" to D255" and the error correction codes E0' to E15' may correspond to one another in the same way.

According to the above-described embodiments of the present disclosure, a plurality of ECC engines capable of correcting errors having different patterns are provided, and one of the plurality of ECC engines may be selected according to an address. Depending on the probability of error occurrence, the efficiency of error correction may be increased by selecting an appropriate ECC engine. In order to increase the number of error patterns that can be processed by the ECC engine, an arrangement of data transmitted between the ECC engine and the memory core may be changed depending on the address. This may increase error occurrence patterns that may be processed by one ECC engine. The above features may be used together or independently.

Although embodiments according to the technical idea of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure. Furthermore, the embodiments may be combined to form additional embodiments.

What is claimed is:

1. A memory comprising:
   a memory core;
   a first ECC engine configured to correct an error having a first pattern, occurring in read data read from the memory core;
   a second ECC engine configured to correct an error having a second pattern, occurring in the read data read from the memory core, wherein one of the first ECC engine and the second ECC engine is selectively activated based on an address used to access the memory core; and
   a data swap circuit configured to change an arrangement of data transmitted between a selected ECC engine and the memory core according to the address.

2. The memory of claim 1, wherein:
   during a write operation of the memory, the selected ECC engine is configured to generate a write error correction code by using write data, and the write data and the write error correction code are written to the memory core; and
   during a read operation of the memory, the selected ECC engine is configured to correct the error in the read data by using the read data and a read error correction code.

3. The memory of claim 1, wherein:
   the first ECC engine is configured to correct a random 1-bit error in the read data and a 2-bit error arranged in the first pattern; and
   the second ECC engine is configured to correct the random 1-bit error in the read data and a 2-bit error arranged in the second pattern.

4. The memory of claim 1, wherein the data swap circuit is configured to further change an arrangement of an error correction code transmitted between the selected ECC engine and the memory core according to the address.

5. The memory of claim 1, wherein:
   the address includes a row address and a column address; and
   the selected ECC engine is selected depending on whether a value of the row address is an even number or an odd number.

6. The memory of claim 5, wherein:
   when the second ECC engine is selected, the data swap circuit is configured to change the arrangement of the data depending on whether a value of the column address is an even number or an odd number; and
   when the first ECC engine is selected, the data swap circuit is configured not to change the arrangement of the data.

7. The memory of claim 1, wherein error patterns mainly occurring in data read from the memory core are different depending on the address.

8. A memory comprising:
   a memory core;
   an ECC engine configured to correct an error in data read from the memory core; and
   a data swap circuit configured to change an arrangement of data transmitted between the ECC engine and the memory core based on an address used to access the memory core.

9. The memory of claim 8, wherein:
   during a write operation of the memory, the ECC engine is configured to generate a write error correction code by using write data, and the write data and the write error correction code are written to the memory core; and
   during a read operation of the memory, the ECC engine is configured to correct an error in the read data by using the read data and a read error correction code.

10. The memory of claim 9, wherein the data swap circuit is configured to further change an arrangement of an error correction code transmitted between the ECC engine and the memory core according to the address.

11. The memory of claim 8, wherein:
   the address includes a row address and a column address; and
   the data swap circuit is configured to change the arrangement depending on whether a value of the row address is an even number or an odd number.

12. The memory of claim 8, wherein:
   the address includes a row address and a column address; and
   the data swap circuit is configured to change the arrangement depending on whether a value of the column address is an even number or an odd number.

13. The memory of claim 8, wherein error patterns mainly occurring in data read from the memory core are different depending on the address.

14. An operation method of a memory, the operation method comprising:
   correcting, by a first ECC engine, an error having a first pattern, occurring in read data read from a memory core based on an address used to access the memory core;
   correcting, by a second ECC engine, an error having a second pattern, occurring in the read data read from the memory core based on the address; and
   changing, by a data swap circuit, an arrangement of data transmitted between the memory core and one of the first ECC engine and the second ECC engine based on the address.

15. The operation method of claim 14, further comprising changing, by the data swap circuit an arrangement of an error correction code transmitted between the memory core and the one of the first ECC engine and the second ECC engine based on the address.

* * * * *